(12) United States Patent
Beutler et al.

(10) Patent No.: US 8,151,663 B2
(45) Date of Patent: Apr. 10, 2012

(54) GEAR ARRANGEMENT

(75) Inventors: Olaf Beutler, Diepholz (DE);
Waldemar Rogowski, Lotte/Wersen (DE); Remt Blankenspeck, Drebber (DE); Günter Lohfink, Bad Harzburg (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 848 days.

(21) Appl. No.: 12/280,866

(22) PCT Filed: Feb. 28, 2007

(86) PCT No.: PCT/DE2007/000374
§ 371 (c)(1),
(2), (4) Date: Aug. 27, 2008

(87) PCT Pub. No.: WO2007/098745
PCT Pub. Date: Sep. 7, 2007

(65) Prior Publication Data
US 2009/0044650 A1    Feb. 19, 2009

(30) Foreign Application Priority Data

Mar. 2, 2006  (DE) .................. 10 2006 010 270

(51) Int. Cl.
*F16H 57/00*  (2012.01)
(52) U.S. Cl. .......................... 74/411; 74/425
(58) Field of Classification Search ............... 74/424.5, 74/425, 411, 388 PS, 406, 409, 440, 443, 74/89.17, 461; 180/443, 444
See application file for complete search history.

(56) References Cited

U.S. PATENT DOCUMENTS

| 3,203,268 | A * | 8/1965 | Manoni et al. ............ 74/411 |
| 4,739,673 | A * | 4/1988 | Ishikawa et al. ............ 74/493 |
| 6,161,512 | A | 12/2000 | Beels Van Heemstede |
| 6,470,993 | B1 * | 10/2002 | Matsuda et al. ............ 180/444 |
| 6,520,042 | B2 * | 2/2003 | Jammer et al. ............ 74/425 |
| 6,915,716 | B2 * | 7/2005 | Doornbos et al. ............ 74/411 |
| 7,650,809 | B2 * | 1/2010 | Bernhard et al. ............ 74/411 |
| 2004/0060379 | A1 * | 4/2004 | Bernhard et al. ......... 74/388 PS |

FOREIGN PATENT DOCUMENTS

| DE | 198 20 182 | 11/1999 |
| DE | 101 37 213 | 3/2002 |
| DE | 10 2004 002 84 | 8/2005 |
| EP | 1 339 596 B1 | 9/2003 |
| JP | 61-260181 | 11/1986 |
| WO | WO 01/44694 | 6/2001 |
| WO | WO 2005/038303 | 4/2005 |

* cited by examiner

*Primary Examiner* — Robert Pezzuto
(74) *Attorney, Agent, or Firm* — McGlew & Tuttle, P.C.

(57) ABSTRACT

A gear arrangement is provided with a built-up for a shaft or pinion to rotate in unison therewith. The gear includes a gear rim and two flanges arranged axially on both sides and fixed them against the gear rim in a positive-locking connection. A hub, over which the respective other parts of the gear are pushed, is formed on at least one of the parts of the gear. The parts of the gear are held together without the use of rivets or screws by a clamped connection including a clamping ring, which is caused to mesh with a groove extending circumferentially on the circumference of the hub or shaft. The clamped connection presses the respective flange outer surface in a spring-mounted manner. Mutually corresponding elevations and depressions on the axial outer surfaces of the gear rim as well as on the axially inner surfaces of the flanges mesh with one another.

20 Claims, 2 Drawing Sheets

US 8,151,663 B2

GEAR ARRANGEMENT

CROSS REFERENCE TO RELATED APPLICATIONS

This application is a United States National Phase application of International Application PCT/DE2007/000374 and claims the benefit of priority under 35 U.S.C. §119 of German Patent Application DE 10 2006 010 270.3 filed Mar. 2, 2006, the entire contents of which are incorporated herein by reference.

FIELD OF THE INVENTION

The present invention pertains to a gear arrangement. It pertains, in particular, to an arrangement with a gear, which comprises a plurality of components and is therefore also called a built-up gear. Prior-art gears of this type comprise, for example, a gear rim made of a plastic and disks or flanges arranged axially on both sides for the mechanical stabilization of this gear rim, wherein preferably at least one of the flanges consists of a metal. It is achieved as a result that the corresponding gear has a very quiet running because of its plastic running surface, but it also has the required mechanical stability and wear resistance due to the simultaneous use of metallic components.

BACKGROUND OF THE INVENTION

A gear arrangement with a built-up gear is known, for example, from WO 01/44694 A1. A gear, which is intended for being mounted on a shaft or a pinion and which comprises a gear rim, which is arranged between two flanges, is described in the document, and the gear rim has a two-part design concerning its radial extension. The two segments of the gear rim are connected in the course of mounting by means of screws, which are passed through the segments of the gear rim at right angles to the longitudinal axis of the pinion or the shaft. The gear rim is mounted together with the flanges arranged axially on both sides on the shaft or the pinion, and its segments enclose a hub formed at one of the flanges. The holding together of the built-up gear axially is likewise brought about by means of screws, which are passed through the gear rim in parallel to the longitudinal axis of the pinion or of the shaft to connect the two flanges. The drawback of this arrangement is the comparatively great effort needed for mounting, but especially the fact that the arrangement is not self-centering in respect to the position of the built-up gear in relation to the shaft or the pinion.

By contrast, the gear arrangements known from EP 1 339 596 B1 and WO 2005/038303 A1, which are likewise embodied with a built-up gear, have the advantage that due to a special design of the components of the built-up gear, they are self-centering. The two outer disks or flanges, which form the gear together with the gear rim, have axially extending projections in these, which pass through the gear rim and mesh with corresponding depressions of the respective other opposite outer disk. Self-centering, which leads to improved power transmission, is achieved as a result. Despite the fact that, moreover, the mounting of the gear is facilitated by the embodiment, the effort needed for mounting still remains high because the components of the built-up gear are screwed or riveted together to achieve reliable holding together in the solutions disclosed in the above-mentioned documents, for which corresponding screws or rivets are passed through additional holes provided for this purpose in a radially inner area of the gear rim. In addition, the large number of holes to be provided for the positive-locking connection of the flanges, on the one hand, and for the screws or rivets at the gear rim, on the other hand, is to be considered to be disadvantageous with respect to the preparation of these holes in an injection molding process. The gear rim does not have, to some extent, a design suitable for plastics in this respect.

SUMMARY OF THE INVENTION

The object of the present invention is to provide a gear arrangement, which avoids the above-mentioned drawbacks of the state of the art. The corresponding gear arrangement with a built-up gear shall be designed for this purpose as a self-centering gear arrangement, on the one hand, and, on the other hand, have a simple design, which leads to a low mounting effort.

The gear arrangement according to the present invention has at least one built-up gear, which is intended for being mounted on a shaft or a pinion in such a way that they rotate in unison. The gear comprises essentially a gear rim and two flanges arranged axially on both sides of the gear rim. The flanges are fitted together with the gear rim in a positive-locking connection, which radially and torsionally fixes them against the gear rim. A hub, over which the respective other parts of the built-up gear are pushed, is formed on at least one of the parts of the built-up gear.

In a manner that is essential for the present invention, the parts of the built-up gear are fitted together in the axial direction without the use of rivets, screws or the like, which would pass through the gear rim. They are rather fixed and held together in the axial direction by a clamping connection, which is embodied by means of at least one clamping ring, which is caused to mesh with a groove extending circumferentially on the circumference of the hub or shaft or pinion. The clamping ring or clamping rings presses/press the axial outer surface of the respective flange in a spring-mounted manner, which said outer surface faces away from the gear rim. Mutually corresponding elevations and depressions on the axial outer surfaces of the gear rim, as well as on the axially inner surfaces of the flanges mesh with one another. Both the elevations and the corresponding depressions may be formed on the gear rim and/or on the flanges. However, in any case, contrary to the state of the art, neither rivets or screws nor the above-mentioned elevations optionally prepared on the flanges pass through the gear rim, so that the gear rim has a design that is advantageous from the viewpoint of manufacturing technology, especially in case it is manufactured from plastics, because of the small number of holes to be provided.

The above-mentioned hub may be formed according to a possible embodiment by a shoulder of the axially inner side of one of the flanges, which said inner side faces the gear rim. In this case, the gear rim and the other flange are pushed over this hub. Another possibility is offered by the fact that corresponding shoulders, which embody the hub, over which a flange is pushed from one side each, are formed axially on both sides on the gear rim.

Various possibilities are also available for designing the clamped connection depending on the rest of the configuration of the gear arrangement. Corresponding to one possible embodiment, clamping rings, which mesh with a groove each and press the axial outer surface of the respective flange in a spring-mounted manner, are arranged on both axial sides of the gear. However, an arrangement, in which one of the flanges is made in one piece with the shaft or pinion, is also conceivable for arranging the gear on the shaft or pinion in such a way that they rotate in unison. It is sufficient in this case to embody the clamped connection by means of a clamping ring. This clamping ring presses the axially outer side of the flange, which is pushed over the hub formed on the other flange together with the gear rim in the axial direction. Such an arrangement of the gear on the shaft or pinion that they rotate in unison is obtained, on the one hand, by the one-piece design of one of the flanges with the shaft or pinion, and, on the other hand, from the axial fixation of the other two components forming the gear on this flange made in one piece with the shaft or pinion.

The groove or grooves, with which the clamping rings are caused to mesh, may be arranged, in principle, depending on the embodiment, either on the shaft or pinion but also on the hub. According to a variant of the above-described embodiment, which is relevant for practice, in which the flange is connected to the shaft in one piece, the clamping ring, of which there is one in this case and which brings about the clamped connection, is caused to mesh with a groove extending circumferentially on the shaft or pinion. The gear rim and the flange made in one piece with the shaft may optionally consist of a plastic in this embodiment, whereas the other flange consists of a metal. As a result, the gear of the arrangement, which gear is equipped with a plastic gear rim, has a very quiet running, and, on the other hand, it has the required mechanical stability due to the metal flange. The manufacture of a corresponding arrangement can be advantageously carried out such that the flange made in one piece with the shaft (pinion) likewise consisting of a metal is embodied by extrusion coating the shaft or pinion in an injection molding process.

Corresponding to an advantageous variant of the present invention, elastomeric damping elements are arranged between the flanges and the gear rim. These are preferably designed as O-rings, which have a plurality of projections on their circumference, and these projections are arranged in the mounted state of the gear rim between corresponding elevations formed on the gear rim or on the flanges. In particular, a very good radial and torsional damping of the arrangement is achieved hereby, and the special design of the damping elements in the form of O-rings makes it advantageously possible to affect the characteristics in respect to radial and/or torsional damping.

The present invention will be explained once again below on the basis of an exemplary embodiment. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENT

Figure 1:
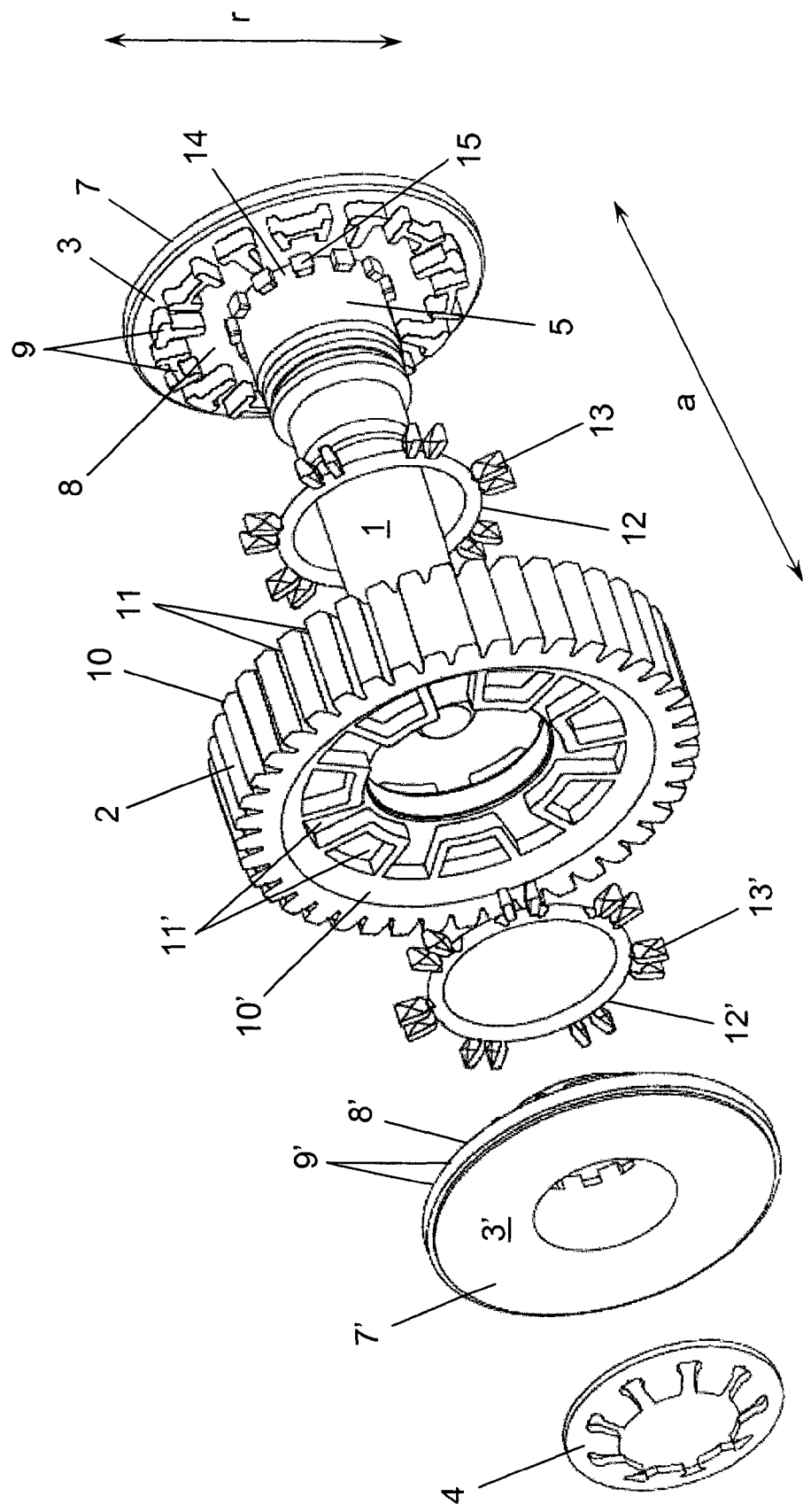
FIG. 1 is an exploded view of a possible embodiment of the gear arrangement according to the present invention.

Referring to the drawings in particular, FIG. 1 shows a possible embodiment of the gear arrangement according to the present invention with a built-up gear 2, 3, 3' in an exploded view. The embodiment shown as an example pertains to a built-up gear 2, 3, 3', which is mounted or is to be mounted on a pinion 1 in such a way that they will rotate in unison. The built-up gear 2, 3, 3' comprises, according to the example, essentially the gear rim 2 and two flanges 3, 3', which are to be fitted together with this gear rim 2, and one each of which is or will be arranged on an axial outer side 10, 10' of the gear rim 2. A shoulder is formed on one of the two flanges 3, and said shoulder forms a hub 5, over which the gear rim 2 and the other flange 3' are pushed in the course of the mounting of the gear 2, 3, 3' on the pinion 1. The components of the gear 2, 3, 3' are fitted together while the gear is being mounted on the pinion 1. A plurality of elevations 9, 9' extending in the axial direction are formed, distributed over the circumference, on the sides 8, 8' of the flanges 3, 3', which sides are the axially inner sides in relation to the overall arrangement. In the course of the mounting, these [elevations] will mesh with corresponding depressions 11, 11' on the axial outer surfaces 10, 10' of the gear rim 2, without passing through the gear rim 2. In addition, O-rings 12, 12' consisting of an elastic material, which act as damping elements, are inserted between the gear rim 2 and the flanges 3, 3' in the example being shown. Due to the O-rings 12, 12', the gear arrangement is provided a damping acting advantageously especially in the torsional direction and in the radial direction r. The components forming the built-up gear 2, 3, 3' are fixed by a clamped connection in the positive-locking connection given by the special shape of their axial surfaces. A clamping ring 4 is pressed for this from at least one axial outer side 7' against the corresponding flange 3', which snaps into a groove 6 provided for this purpose. In the example being shown, the flange 3 having the shoulder for forming the hub 5 is made in one piece with the pinion 1, on which the built-up gear 2, 3, 3' will be mounted. On the one hand, an axial fixation is already given by the fact that the corresponding flange 3 is made in one piece with the pinion 1. Consequently, a corresponding clamped connection by means of a clamping ring 4 is necessary on the other axial outer side 7' only. Depending on the particular use and the concrete design of the arrangement, which is determined by the use and in which neither of the flanges 3, 3' may be connected in one piece to the shaft or pinion 1, it may, however, be necessary to fix the arrangement on both sides by means of a corresponding clamping ring 4.

In the embodiment being shown, the clamping ring 4 is pushed over the pinion 1 from the axial outer side located opposite the flange 3 connected in one piece to the pinion 1, and it will mesh with a groove 6 extending circumferentially on the circumference of the pinion 1, which groove is arranged corresponding to the intended positioning for the gear 2, 3, 3' in relation to the axial extension of the pinion 1. However, it is also conceivable in the example being shown that the hub 5 formed on this flange 3 passes through the gear rim 2 as well as the opposite flange 3' and the groove needed for snapping in the clamping ring 4 is provided in the passing-through area on the outer circumference of the hub 5. In any case, the hub 5 is positioned such that the clamping ring 4, which will mesh with it, presses the axial outer surface 7' of flange 3' and thus presses the flange 3' and the gear rim 2 together against the opposite flange 3. Reliable axial fixation of the gear components and reliable holding together thereof are guaranteed hereby without an additional screw or riveted connection being necessary for this. Since the gear rim 2, 3, 3' has no holes because of the design of the gear arrangement according to the present invention, aside from the middle area, in which it passes through the hub 5 of flange 3, the gear rim has a markedly more favorable shape with respect to the injection molding process, which is used to manufacture it, than in other solutions known from the state of the art.

Figure 2:
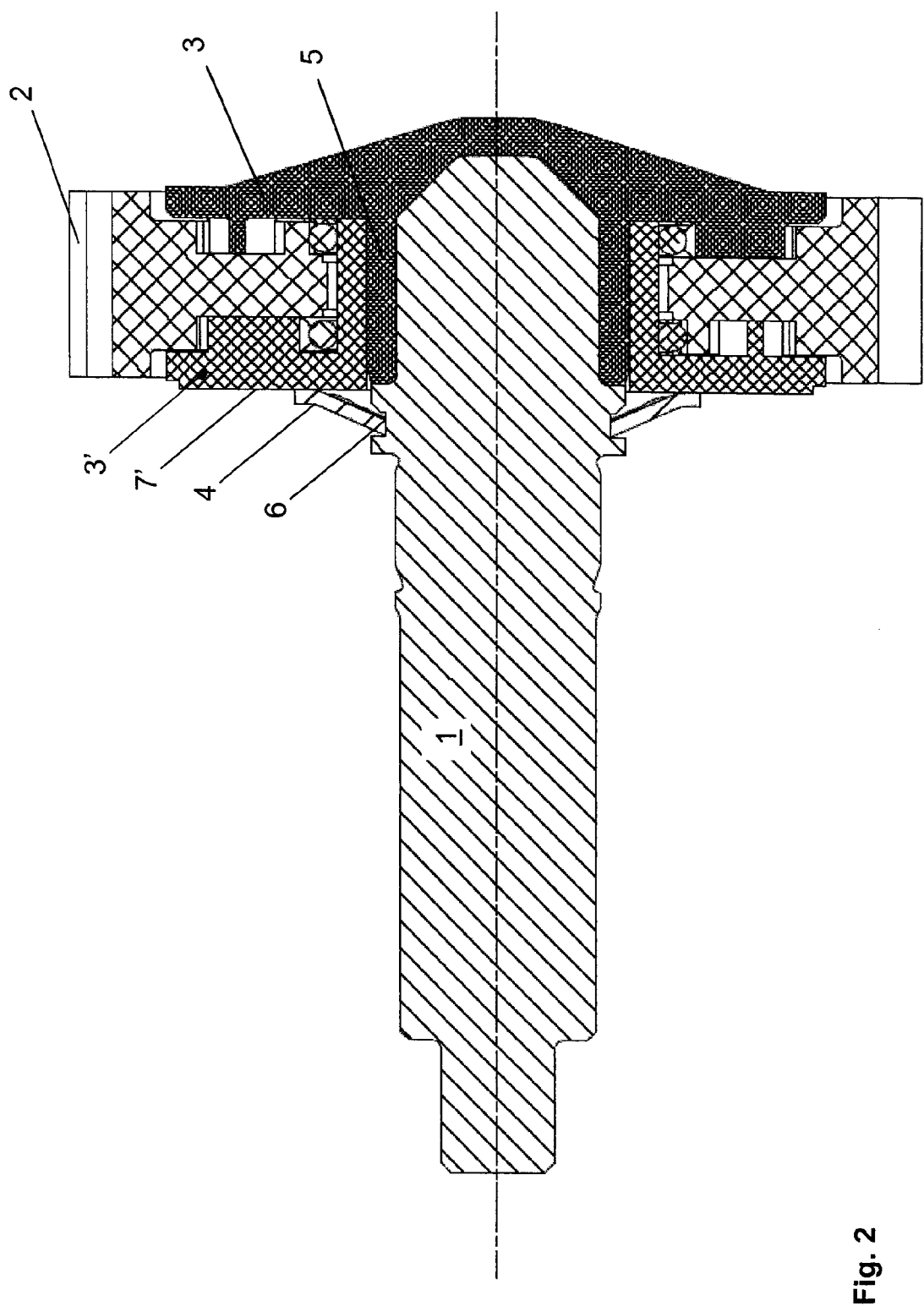
FIG. 2 is a sectional view showing the embodiment according to FIG. 1.

FIG. 2 shows once again the arrangement according to FIG. 1, which was explained before, in an axial sectional view in the mounted state. In particular, the holding together of the components of the built-up gear 2, 3, 3', which is ensured by the clamped connection, can be clearly recognized in this view. As can be seen, the clamping ring 4 meshes with a groove 6 extending circumferentially on the outer circumference of the pinion during the mounting of the arrangement. Due to its corresponding shape, the clamping ring 4 presses, in the manner of a clamping spring, the other components of the gear 2, 3, 3' and fixes same in their arrangement in relation to one another.

While a specific embodiment of the invention has been shown and described in detail to illustrate the application of the principles of the invention, it will be understood that the invention may be embodied otherwise without departing from such principles.

The invention claimed is:

1. A gear arrangement comprising:
    a shaft or pinion; and
    a built-up gear mounted on said shaft or pinion such that said built-up gear and said shaft or pinion rotate in unison, said built-up gear comprising:
    a gear rim;
    a first side flange;
    a second side flange, said first side flange and said second side flange being arranged axially on both sides of said gear rim, said first side flange and said second side flange being fitted together with said gear rim with a positive-locking connection including one or more of elevations formed on the inner axial lateral surfaces of said first side flange and said second side flange and extend axially in a direction of said gear rim and mesh with corresponding depressions formed on axial lateral surfaces of said gear rim, or depressions formed on the inner axial lateral surfaces of said first side flange and said second side flange and mesh with corresponding elevations formed on the axial lateral surfaces of said gear rim and extend axially in the direction of said first side flange and said second side flange, said positive-locking connection fixing said first side flange and said second side flange radially and torsionally with respect to said gear rim;
    a hub over which said first side flange, said second side flange and said gear rim are pushed for assembly of the gear arrangement, said hub being formed on one of said first side flange, said second side flange and said gear rim;
    a clamped connection, said first side flange, said second side flange and said gear rim being held together and fixed against each other in an arrangement axial direction by said clamped connection, said clamped connection comprising a clamping ring meshing with a groove extending on a circumference of one of said hub, said shaft or pinion, said clamping ring pressing an axial outer surface of one of said first side flange and said second side flange in a spring-mounted manner, said axial outer surface facing away from said gear rim.

2. A gear arrangement in accordance with claim 1, wherein said hub is formed by a shoulder on the axially inner side of one of said first side flange and said second side flange, each axially inner side facing said gear rim.

3. A gear arrangement in accordance with claim 1, wherein said hub is formed by two shoulders on the two axial outer sides of gear rim.

4. A gear arrangement in accordance with claim 1, wherein said clamping ring presses an axial outer side of a respective said first side flange and said second side flange in a spring-mounted manner, wherein one of said axial lateral surfaces of said gear rim and said axial lateral surfaces of said first side flange and said second side flange defining said depressions extend continuously, said depressions defined by one of said axial lateral surfaces of said gear rim and said axial lateral surface of said first side flange and said second side flange not extending completely through said one of said gear rim and said first and second side flanges.

5. A gear arrangement in accordance with claim 1, wherein said hub is formed by a shoulder on one of said first side flange and said second side flange, said one of said first side flange and said second side flange having the shoulder for forming the hub being made in one piece with said shaft or pinion and for providing an axial holding means with the one-piece design with the shaft or pinion and by said clamping ring pressing in the axial direction the axially outer side of the other said first side flange and said second side flange pushed together with said gear rim over the hub formed on the first flange, so that the entire gear is arranged as a result on the shaft or pinion in such a way that they rotate in unison.

6. A gear arrangement in accordance with claim 5, wherein said gear rim consists of a plastic and said first side flange consists of a metal, and said second side flange is formed by extrusion coating said shaft or pinion, said shaft or pinion consisting of metal.

7. A gear arrangement in accordance with claim 5, wherein said clamping ring meshes with said groove and said groove extends circumferentially on said shaft or pinion.

8. A gear arrangement in accordance with claim 1, further comprising:
    elastomeric damping elements arranged respectively between said gear rim and said first side flange and gear rim and said second side flange.

9. A gear arrangement in accordance with claim 8, wherein said damping elements comprise O-rings each with a plurality of projections rising radially outwardly on a circumference of each of said O-rings, said projections protruding into intermediate spaces between elevations rising in an axial direction from one or more of said first side flange, said second side flange and said gear rim.

10. A gear arrangement comprising:
    a shaft or pinion;
    a gear rim;
    a first side flange;
    a second side flange, said first side flange and said second side flange being arranged axially on both sides of said gear rim to form a built-up gear, said first side flange and said second side flange being fitted together with said gear rim with a positive-locking connection including one or more of elevations formed on the inner axial lateral surfaces of said first side flange and said second side flange and extend axially in a direction of said gear rim and mesh with corresponding depressions formed on axial lateral surfaces of said gear rim, or depressions formed on the inner axial lateral surfaces of said first side flange and said second side flange and mesh with corresponding elevations formed on the axial lateral surfaces of said gear rim and extend axially in the direction of said first side flange and said second side flange, said positive-locking connection fixing said first side flange and said second side flange radially and torsionally with respect to said gear rim;
    a hub over which said first side flange, said second side flange and said gear rim are pushed for assembly of the gear arrangement, said hub being formed on one of said first side flange, said second side flange and said gear rim;

a clamped connection, said first side flange, said second side flange and said gear rim being held together and fixed against each other in an arrangement axial direction by said clamped connection, said clamped connection comprising a clamping ring meshing with a groove extending on a circumference of one of said hub, said shaft or pinion, said clamping ring pressing an axial outer surface of one of said first side flange and said second side flange in a spring-mounted manner, said axial outer surface facing away from said gear rim, said built-up gear being mounted on said shaft or pinion such that said built-up gear and said shaft or pinion rotate in unison.

11. A gear arrangement in accordance with claim 10, wherein said hub is formed by a shoulder on the axially inner side of one of said first side flange and said second side flange, each axially inner side facing said gear rim.

12. A gear arrangement in accordance with claim 10, wherein said hub is formed by two shoulders on the two axial outer sides of gear rim.

13. A gear arrangement in accordance with claim 10, wherein said clamping ring presses an axial outer side of a respective said first side flange and said second side flange in a spring-mounted manner, wherein one of said axial lateral surfaces of said gear rim and said axial lateral surfaces of said first side flange and said second side flange defining said depressions extend continuously, said depressions defined by one of said axial lateral surfaces of said gear rim and said axial lateral surface of said first side flange and said second side flange not extending completely through said one of said gear rim and said first and second side flanges.

14. A gear arrangement in accordance with claim 10, wherein said hub is formed by a shoulder on one of said first side flange and said second side flange, said one of said first side flange and said second side flange having the shoulder for forming the hub being made in one piece with said shaft or pinion and for providing an axial holding means with the one-piece design with the shaft or pinion and by said clamping ring pressing in the axial direction the axially outer side of the other said first side flange and said second side flange pushed together with said gear rim over the hub formed on the first flange, so that the entire gear is arranged as a result on the shaft or pinion in such a way that they rotate in unison.

15. A gear arrangement in accordance with claim 14, wherein said gear rim consists of a plastic and said first side flange consists of a metal, and said second side flange is formed by extrusion coating said shaft or pinion, said shaft or pinion consisting of metal.

16. A gear arrangement in accordance with claim 14, wherein said clamping ring meshes with said groove and said groove extends circumferentially on said shaft or pinion.

17. A gear arrangement in accordance with claim 10, further comprising:
elastomeric damping elements arranged respectively between said gear rim and said first side flange and gear rim and said second side flange.

18. A gear arrangement in accordance with claim 17, wherein said damping elements comprise O-rings each with a plurality of projections rising radially outwardly on a circumference of each of said O-rings, said projections protruding into intermediate spaces between elevations rising in an axial direction from one or more of said first side flange, said second side flange and said gear rim.

19. A gear arrangement comprising:
a shaft or pinion;
a gear rim;
a first side flange;
a second side flange, said first side flange and said second side flange being arranged axially on both sides of said gear rim to form a built-up gear, said first side flange and said second side flange being fitted together with said gear rim with a positive-locking connection including one of elevations and depressions formed on inner axial lateral surfaces of said first side flange and said second side flange and the other one of said elevations and depressions formed on axial lateral surfaces of said gear rim, said elevations meshing with said depressions, said elevations extending axially in a direction of one said first and said second side flanges and said gear rim, said positive-locking connection fixing said first side flange and said second side flange radially and torsionally with respect to said gear rim;
a hub over which said first side flange, said second side flange and said gear rim are pushed for assembly of the gear arrangement, said hub being formed on one of said first side flange, said second side flange and said gear rim;
a clamped connection, said first side flange, said second side flange and said gear rim being held together and fixed against each other in an arrangement axial direction by said clamped connection, said clamped connection comprising a clamping ring meshing with a groove extending on a circumference of one of said hub, said shaft or pinion, said clamping ring pressing an axial outer surface of one of said first side flange and said second side flange in a spring-mounted manner, said axial outer surface facing away from said gear rim, said built-up gear being mounted on said shaft or pinion such that said built-up gear and said shaft or pinion rotate in unison.

20. A gear arrangement in accordance with claim 19, wherein one of said axial lateral surfaces of said gear rim and said axial lateral surfaces of said first side flange and said second side flange defining said depressions extend continuously, said depressions defined by one of said axial lateral surfaces of said gear rim and said axial lateral surface of said first side flange and said second side flange not extending completely through said one of said gear rim and said first and second side flanges.

* * * * *